United States Patent [19]

Frye

[11] Patent Number: 5,685,687
[45] Date of Patent: Nov. 11, 1997

[54] LOADING AND UNLOADING ASSIST APPARATUS FOR A VEHICLE

[75] Inventor: Robert L. Frye, Lake Wales, Fla.

[73] Assignee: Florida High Reach Inc., Lake Hamilton, Fla.

[21] Appl. No.: 499,864

[22] Filed: Jul. 10, 1995

[51] Int. Cl.⁶ .................................................. B65G 67/24
[52] U.S. Cl. .......................... 414/505; 414/495; 414/508; 414/523; 414/528; 414/786; 198/809
[58] Field of Search ............................. 414/501–505, 414/507, 508, 495, 523, 528, 924, 926, 786, 796.7; 198/809

[56] References Cited

U.S. PATENT DOCUMENTS

| | | | |
|---|---|---|---|
| 2,464,217 | 3/1949 | Dillingham | 414/523 |
| 2,521,727 | 9/1950 | Kappen | 414/501 |
| 3,164,246 | 1/1965 | De Good | 198/809 |
| 3,191,747 | 6/1965 | Pollard | 198/809 X |
| 3,825,107 | 7/1974 | Cary et al. | 414/523 X |
| 4,081,094 | 3/1978 | Pereira et al. | 414/528 X |
| 4,273,234 | 6/1981 | Bourgeois | 198/809 X |
| 4,505,634 | 3/1985 | Rezac | 414/528 |
| 4,832,553 | 5/1989 | Grey et al. | 414/505 X |
| 4,844,684 | 7/1989 | Bradley | 414/528 |
| 5,104,281 | 4/1992 | Corvi | 414/528 |
| 5,476,360 | 12/1995 | Liljevik | 414/495 X |

Primary Examiner—David A. Bucci
Attorney, Agent, or Firm—Joseph G. Nauman

[57] ABSTRACT

A truck is fitted with an unloading conveyor for carrying packages of material, e.g. roofing shingles, from a transfer station on the truck bed, preferably at its rear. This conveyor can swing in an arc about its mounting adjacent the transfer station, and its azimuth can be adjusted to reach a wide variety of delivery sites. The truck bed can carry multiple rows of stacked packages such as pallettized loads of roofing shingles, and is fitted with a bed conveyor system to move an entire row of loads to the transfer station. Upper flights of the bed conveyor move toward a lift platform designed to receive a few of the palletized loads as these are carried to the transfer station. An operator removes the packages from the loads and places them onto the discharge conveyor. As the loads are emptied, the lift platform can rise so the operator only shifts the packages onto the discharge conveyor with minimal lifting. When the load(s) on the lift platform are depleted, the next palletized load(s) can be moved by the bed conveyor system onto the previously lowered lift platform. A control console at the transfer station allows a single operator to control the angular and azimuth position of the discharge conveyor, the motion of the lift platform, and functioning of the bed conveyor while the operator performs the transfer of loads.

9 Claims, 6 Drawing Sheets

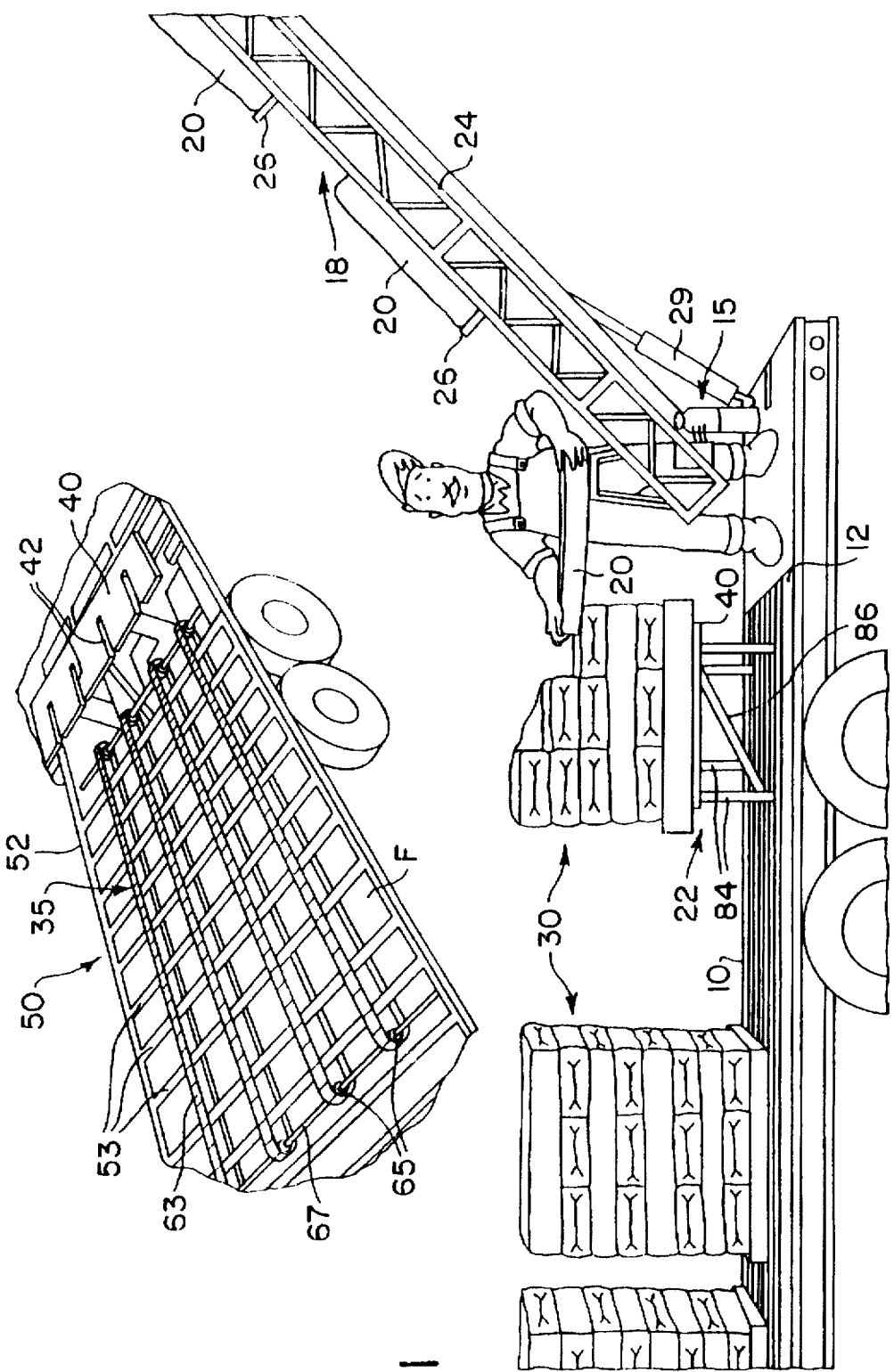

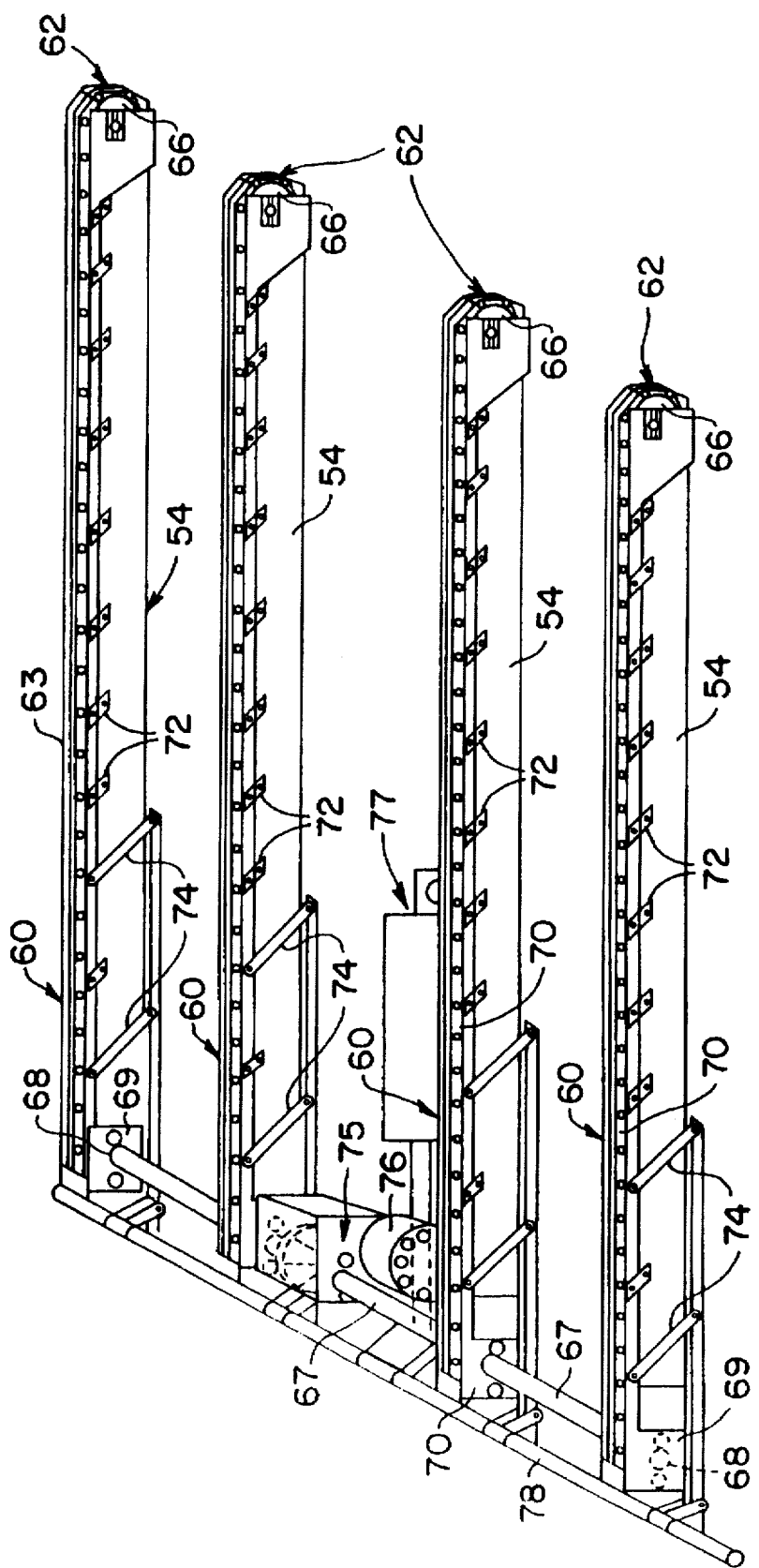

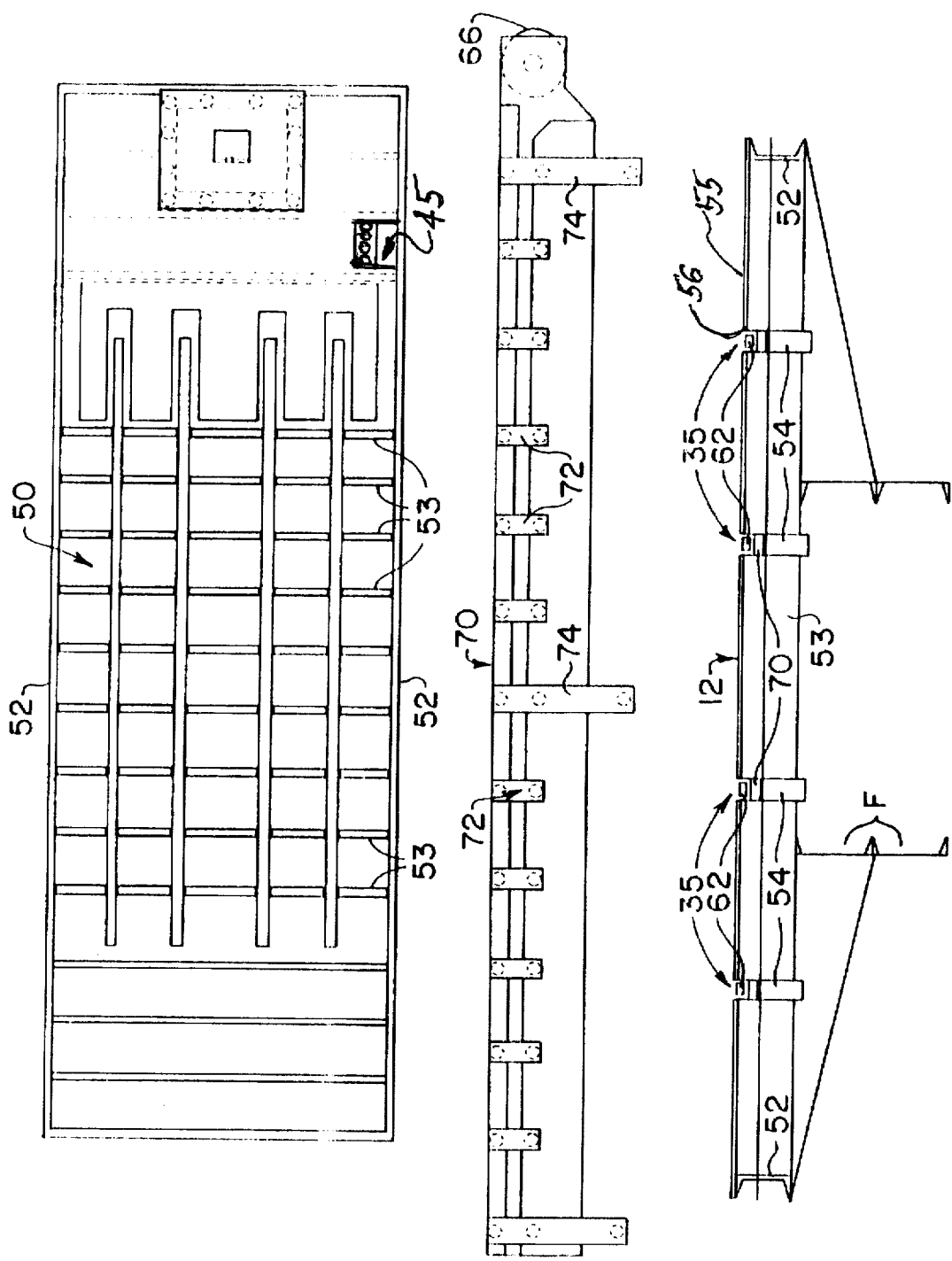

LOADING AND UNLOADING ASSIST APPARATUS FOR A VEHICLE

FIELD OF THE INVENTION

This invention relates to apparatus for use on a vehicle such as a truck designed to transport and deliver palletized loads of stacked packages. Specifically, the apparatus is useful in the transporting and delivery of packages of roofing materials, such as shingles, directly to the site of their application, e.g upon a building roof.

BACKGROUND OF THE INVENTION

Various forms of delivery trucks of the self-unloading type are used to transport roofing materials to a building site. Other uses of such equipment will suggest themselves to persons skilled in the art. In general, vehicles presently in service are flat bed trucks fitted with either a full bed lift, e.g. a "scissors" truck, or with different types of boom-like devices. One such device can pick up full pallet loads of stacked roofing packages (such as shingles) from the vehicle bed and deposit the full load adjacent the vehicle. Another device comprises a turret mounted boom-like conveyor which can convey individual ones of the packages from a position at the conveyor turret to a site spaced from, and commonly above, the vehicle bed. The first form of device handles full pallet loads, which are later broken down into individual packages and delivered to a site as by use of a separate conveyor system, or even by unloading a pallet load as it is held near the chosen site by the device. The swinging conveyor requires the packages to be unloaded from palletized loads on the truck bed and carried to the discharge conveyor, where they are conveyed to the chosen delivery site, such as upon a roof.

In the full pallet unloaded, the device is occupied the full time the packages are being removed and distributed, at the chosen site, form the suspended pallet. In the turret supported conveyor type of device, a laborer (often the vehicle driver) must tote the individual packages from the pallets to the receiving end of the conveyor, requiring lifting of many heavy packages and carrying them at least part of the length of the vehicle bed, then placing them on the conveyor. This sort of labor is quite strenuous, and the only mechanical assistance for the laborer is the conveyor which carries the packages upward and outward of the vehicle bed to the chosen site. By way of example, individual packages of roofing shingles weigh in the order of 80 pounds, and pallet loads range from about 2600 to 3000 pounds per loaded pallet.

SUMMARY OF THE INVENTION

The present invention relates to those vehicles which utilize the off-loading or discharge conveyor fitted to the vehicle body. A vehicle, such as a flat bed delivery truck, is fitted with a serial unloading conveyor for carrying packages of material, e.g. roofing shingles, from a transfer station on the truck bed, preferably at its rear. This conveyor can swing in an arc, preferably 180°, about its turret-type mounting adjacent the transfer station, and its azimuth, i.e. its angle of incline with respect to the bed platform can be adjusted, so as to reach a wide variety of delivery sites, such as on a roof adjacent where the vehicle is parked, or on the ground adjacent the vehicle.

The truck bed is capable of carrying one or more rows of stacked packages such as pallettized loads, and is fitted with a load conveyor system that can move the entire row (or rows) of loads to the transfer station. In one embodiment, twelve pallets can be carried on the platform bed, each comprising twelve to fourteen "squares" or packages of roofing shingles. The active or upper flights of the bed conveyor system are carried toward a lift platform which is designed to receive one or two of the palletized loads, as these are carried to the transfer station. A laborer at this transfer station simply removes the packages from the loads, one at a time (e.g. in serial fashion) and places them onto the discharge conveyor. As the loads are emptied, the lift platform can be raised so the laborer has only to move the packages onto the discharge conveyor, with minimal lifting. A rest is provided near the base of the off loading or discharge conveyor to assist this transferring action. Once the pallet is fully unloaded, it is set aside. When the pallet load(s) on the lift platform are finished, the next palletized load(s) in the row(s) can be moved by the bed conveyor system onto the previously lowered lift platform.

A control console at the transfer station allows the driver/operator to control the angular and azimuth position of the off loading or discharge conveyor, the motion and particularly the partially raised positions of the lift platform, and the functioning of the bed conveyor. This permits a vehicle driver to deliver a complete load of roofing materials at one or more chosen sites remote from the vehicle bed, and within reach of the discharge end of the off loading conveyor, without having to carry any of the packages of shingles or like materials along the length of the vehicle bed.

The two conveyors are reversible, so the system can be used to re-load packages from the chosen site. This may happen from time to time if, for example, the color of certain roofing does not have an expected appearance, and it is necessary to replace the off loaded packages.

The principal object of the invention, therefore, is to provide self-unloading apparatus for a vehicle which can carry a large number of loads, for example pallets of stacked packages or a plurality of goods in cartons or cases, which apparatus can move those loads to a transfer station where they can easily be off loaded, or transferred to a delivery station or delivery conveyor, with a minimum of lifting, and which can deliver the packages in serial fashion to a chosen site; to provide such an apparatus which assists unloading, or in certain instances loading, of such a delivery vehicle to the point that a single person can control the functions of the apparatus and can also place the packages onto the delivery conveyor from the stacks of packages on the palletized loads, or to replace the packages on pallets on the lift platform, with minimized effort and with substantial saving of time.

Other objects and advantages of the invention will be apparent from the following description, the accompanying drawings and the appended claims.

BRIEF DESCRIPTION OF THE DRAWINGS

FIG. 1 is a diagrammatic perspective view of the apparatus provided by the invention;

FIG. 2 is a perspective view showing the truck bed with its floor removed, the bed conveyor, and the lift with the lift platform in a raised position;

FIG. 3 is a schematic perspective view showing details of the bed conveyor;

FIG. 4 is a diagrammatic plan view of the bed platform, the major elements of the bed conveyor, the lift platform, and the base of the turret which mounts the off-loading conveyor;

FIG. 5 is a cross-sectional view of one of the principal elements of the bed conveyor;

FIG. 6 is a cross-sectional view through the platform and its bed, the truck bed structure, and the elements of the bed conveyor;

FIG. 7 is a diagrammatic cross-sectional view through one element of the bed conveyor, showing routing of the roller chain;

DESCRIPTION OF THE PREFERRED EMBODIMENT

Method and Operation of Unloading

Figure 8:
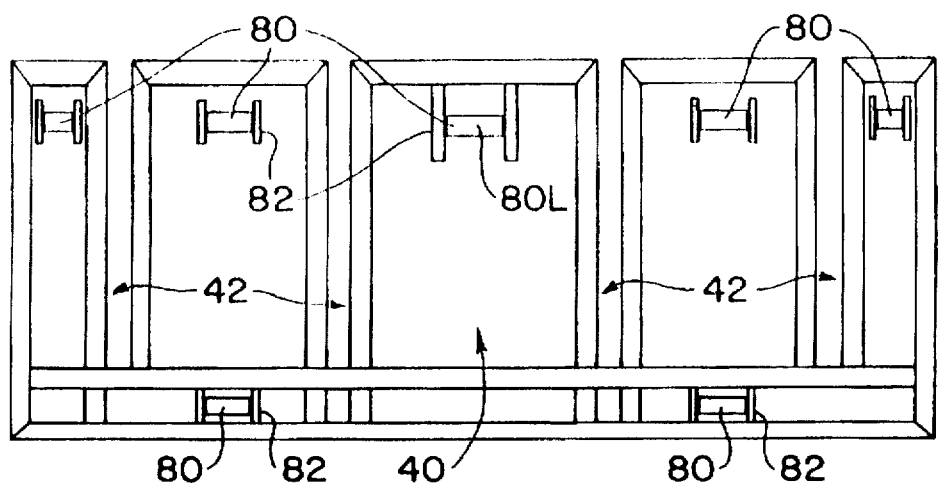
FIG. 8 is a bottom view of the lift platform.

The unloading and delivery method provided by the invention is illustrated schematically by FIG. 1. An operator (who may be the delivery vehicle driver) stands at a transfer station near the rear of the bed platform, which is fitted to the vehicle bed, usually a flat bed truck. At the rear of this platform is the turret-type base of an off-loading conveyor which can be rotated about a vertical axis, and change its azimuth (inclination between horizontal and vertical) to locate the discharge end of such conveyor at a chosen delivery site. In delivering loads of roofing shingles this location would be at a place on a roof convenient to the roofing workers, who would remove the packages from the off-loading conveyor and stack or distribute them appropriately.

The loads of packages, such as palletized loads of roofing shingle packages, are placed on the bed platform in one or more rows, located generally over and forward of the axles of the vehicle chassis for proper load distribution and stability during transport. This may typically be accomplished by a mobile lift truck which can carry and lift the palletized loads.

Normally retracted into the bed platform is a bed conveyor provided by a series of parallel conveyor roller chains which extend from a forward position on the bed platform, where the bed conveyor drive can conveniently be located, to the transfer station. There, the conveyor chains enter slots in a transfer lift platform supported by lifting links and a lift mechanism. The lift platform normally retracts so as to be substantially flush with the bed platform.

The bed conveyor structure can be lifted a small distance, such that the upper flights of the chains are slightly above the bed platform surface and thus lifting and bearing the weight of all the palletized loads of packages. This conveyor system is then driven to move the load rearward, with the rear most load (or loads) entering fully onto and over the lift platform, at which time the bed conveyor is halted. At this instance, with the off-loading conveyor boom properly situated, the operator can start the off-loading conveyor and move individual packages onto that conveyor, as shown. Note that as the packages are removed from the loads, the lift platform can be raised appropriately by the operator, so the uppermost remaining packages are at the most convenient and least strenuous position for moving by the operator. The turret structure supporting the off-loading conveyor boom may include a lift cylinder to raise and lower the base of that conveyor over a small distance, to assist in placing the top packages of the loads on the lift platform at an elevation convenient to the loading or entry part of the off-loading boom conveyor, as by sliding the packages across a small rest member.

When the loads are completely unloaded, the lift platform is fully retracted (lowered), and the bed conveyor actuated to carry the next load(s) onto the lift platform, etc., this sequence being repeated until the full complement of loads is delivered. When a delivery is completed, the lift platform and the bed conveyor can be retracted, and the off-loading conveyor boom turned to face over the bed platform for transport to obtain more loads.

Figure 10:
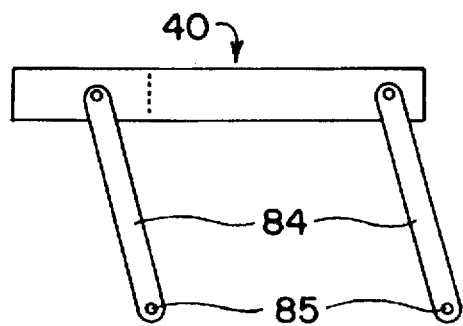
FIG. 10 is a diagram showing two of the links of the transfer lift mechanism.

Referring to FIG. 1, the apparatus, provided to perform the above described method of present invention, relates to those vehicles which utilize an off-loading or discharge conveyor fitted to the bed 10 of a flat bed truck vehicle body. The flat bed 12 is fitted with a bed platform or floor 12 extending rearward of the truck and having a turret-type mount 15 at the rear of the bed, supporting a serial unloading conveyor 18 for carrying packages 20 of material, e.g. roofing shingles, from a transfer station 22 on the truck bed adjacent and just forward of the lower or loading end of conveyor 18. This conveyor is of conventional design and includes a truss-like boom 24 housing an endless conveyor chain or chains 25 fitted with regularly spaced plates 26 against which packages can be placed and carried upward to the discharge end of the boom 24. The chains are typical roller chains comprising a series of roller members connected by side links forming a sturdy flexible chain. The chains are driven by a reversible hydraulic motor 27. Conveyor 18 can swing in an arc about mount 15 under control of a reduction gear connection to a reversible hydraulic motor 28. The angle of upward incline of boom 24 (its azimuth) can be adjusted under control of a hydraulic cylinder 29, so as to position the boom to reach a chosen delivery site on a roof adjacent where the vehicle is parked. Further details follow in the description of FIG. 10.

The bed floor 12 is capable of carrying one or more rows of pallettized loads 30 of stacked packages 20, and is fitted with a bed conveyor system 35 which can move the entire row (or rows) of loads 30 to transfer station 22. In one embodiment, twelve pallets can be carried on platform bed 12, each comprising twelve to fourteen "squares" or packages 20 of roofing shingles. Conveyor system 35 includes a plurality of parallel conveyor chains 60 (later described) having active or upper flights which are normally (at rest) located within slots formed along bed platform 12. These chains can be raised slightly above the level of bed platform 12 (as later explained) and driven toward a lift platform 40 which is designed to receive one or two of the palletized loads 30, as these are carried to transfer station 22. Lift platform 40 occupies the front region of transfer station 22, and at rest is lowered into an opening in bed floor 12, flush with that platform. The ends of bed conveyor chains toward the rear of bed floor 12, extend into slots 42 in platform 40, so the loads are moved onto the lift platform 40 as the bed conveyor is operated. An operator at transfer station 22 simply removes packages 20 from the loads 40, one at a time (e.g. in serial fashion) and places them onto the discharge conveyor 18, as shown in FIG. 1. As the loads are emptied, lift platform 40 can be raised by the operator so he has only to move packages 20 over onto the discharge conveyor 18, with minimal lifting. When the load(s) on the lift platform are finished, the pallet (or pallets) itself is set aside, the next palletized load(s) in the row(s) can be moved by the bed conveyor system 35 onto the previously lowered lift platform 40.

A control console 45 near at the transfer station 22 allows the operator to control the angular and azimuth position of the discharge conveyor 18, the motion and particularly the partially raised positions of the lift platform 40, and the functioning of bed conveyor 35. This permits a vehicle driver/operator to deliver a complete load of roofing materials at one or more chosen sites remote from the vehicle bed, and within reach of the discharge end of discharge conveyor 18, without having to carry any of the packages of shingles or like materials along the length of the vehicle bed. Details are described in connection with FIG. 11.

The Bed Conveyor

In the illustrated embodiment a bed frame 50, comprising side rails 52, cross beams 53, and central tubular rails 54, is supported on the truck frame F (FIGS. 2 & 6) extending rearward over the rear undercarriage as shown in FIGS. 2 and 3. The bed floor 12 is formed of a plate or plates 55 attached to bed frame 50, and includes fore/aft extending slots 56. A plurality of dual chain conveyors 60 four are shown) extend parallel to side rails 52, spaced apart approximately evenly and aligned with slots 56, between those rails. The chains 60 are roller chains of conventional construction, as mentioned, having rollers incorporated into the chain links, each divided into upper flights 63 and lower flights 64 (within tubular rails 54) and passing around drive sprockets 65 near the front of bed frame 50, and around idler sprockets 66 supported at the rear ends of central rails 54 (FIG. 5) near lift platform 22. Drive sprockets 65 are secured to and rotated by a transverse drive shaft 68 supported by a plurality of bearings 68 which are in turn are supported from the forward ends of support rails 69. The dual chains 62 of chain conveyors 60 are aligned with and substantially fill the floor plate slots 56. In a typical embodiment, those slots are about four inches in width.

Each of the chain conveyors 60 has a support rail 70 (on top of rails 54) beneath the corresponding upper flight 63, and over which the rollers of the chain links can roll as the chain is driven. The lower flights 64 return through the central rails 54, which preferably are box or inverted U-shape in cross-section. The support rails 70 carry brackets 69 and are secured to the upper parts of central rails 54 by pivoted links 82, each having a pivot connection near its opposite ends to rails 54 and 80, as seen in FIGS. 3, 5, and 7. Near the opposite ends of these rails, and also about midway of their length, the master pivot links or control links 74 extend below central rails 54 and provide a lift/lower connection to the chain conveyor support rails 70. In FIG. 5, a support rail 80 is shown in the raised or operative position, and in FIGS. 6 and 7 rails 80 are in lowered or rest position.

Drive shaft 68 is rotated through a chain and sprocket transfer box 75, which is powered by a rotary motor 76, preferably a reversible hydraulic motor, all suspended from rails 70. Thus, all chain conveyors 60 are driven in synchronism. Raising and lowering of the chains through floor slots 56 will present a wide based conveying support capable of lifting whatever loads (pallets, etc.) may be resting on the chains. This raising motion is accomplished by lift cylinders 77 acting upon a control shaft 78 which is connected to each of the master control links 74. Moving these links clockwise (as viewed in FIG. 5) raises the support rails 70 to the position shown, where links 72 are vertical and bear together the weight of the carried loads. The aforementioned slack in lower chain flights 63 allows this raising motion while maintaining mesh of the chains and sprockets. Motor 76 can then be actuated to carry the loads to transfer station 22 and lift platform 40.

The bed conveyor system can be utilized independent of a lift platform and discharge conveyor, as for the purpose of selectively moving loads stowed on a truck bed floor to any convenient transfer station, from which the loads may be taken by a variety of devices.

The Transfer Lift

Figure 9:
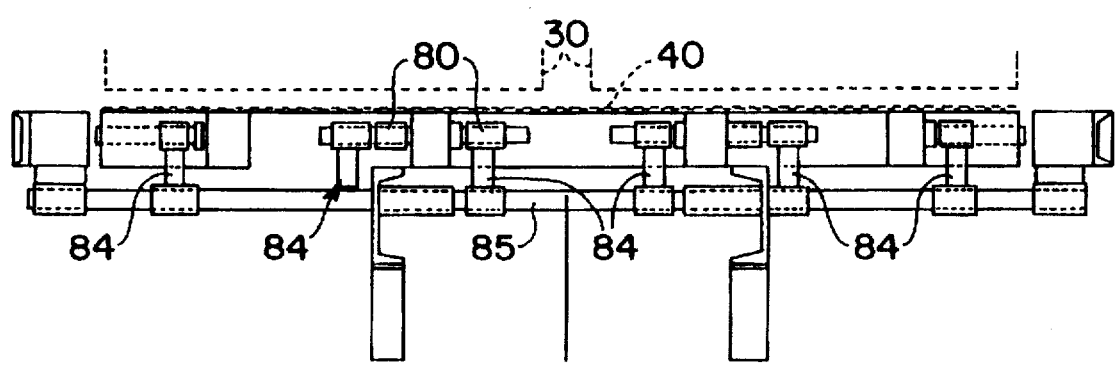
FIG. 9 is a cross-sectional view through the platform and its bed, showing the transfer lift mechanism.
Figure 11:
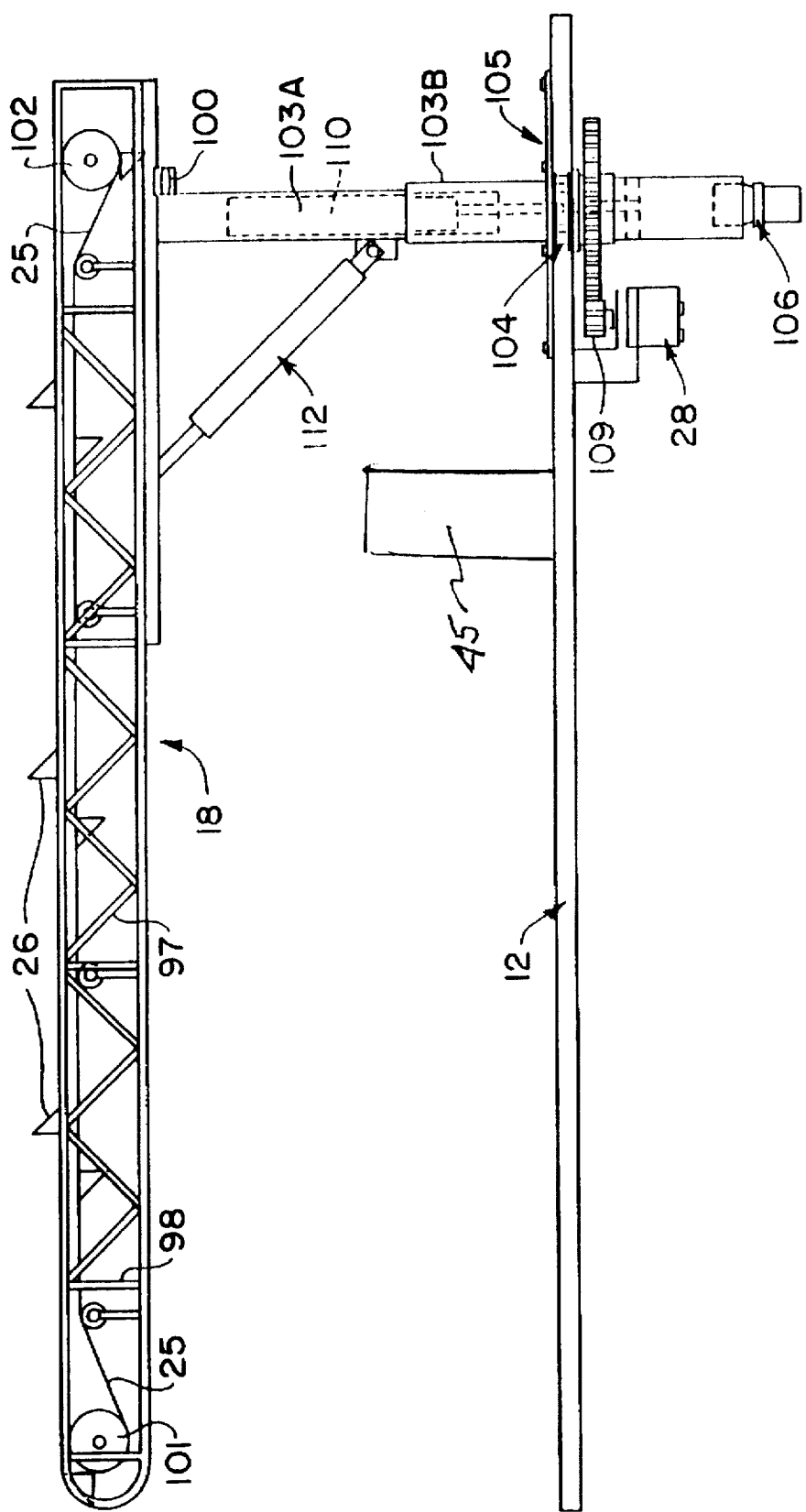
FIG. 11 is a diagrammatic view of the discharge conveyor and its mounting.

Lift platform 40 has a plurality of slots 42 which match and align with chain conveyors 60 of the bed conveyor system 35. As chain conveyors 60 are driven to move loads rearward of the bed frame 50, the rear-most loads are carried onto lift platform 40. FIGS. 8, 9 and 11 show platform 40, its under structure, and the associated lift mechanism. On the bottom of platform 40 are a number of bushings 80 held on depending brackets 82. Four of these brackets are located at the front, and two at the rear, of platform 40 (FIG. 11). Lift control arms 84 are pivotally connected at their upper ends to bushings 80, and pivotally connected at their lower ends to a pair of spaced apart control shafts 85, which have pivot connections to the side beams 52. These cooperate to provide a parallelogram control linkage which keeps platform 40 level as it raises and lowers (see FIGS. 1 & 10).

The rod end of a hydraulic lift cylinder 86 is connected to the central bushing 80L; the head end of that cylinder is anchored with a pivot to the frame, and the cylinder is controlled by the operator so as to move platform 40 between a lowered (stowed or receiving) position (FIG. 10) and raised positions as determined by the operator (FIGS. 1 & 2).

Discharge Conveyor Mounting

The discharge conveyor 18, normally used for off loading of packages, has a conventional ladder like boom 24 comprising side trusses 97 connected by cross struts 98 and supporting the upper and lower shafts and sprockets 101,102 of the set of endless conveying chains 60, which have lugs or plates 26 fitted cross-wise to chains 60, so as to support packages rested on the chains while the chains are driven to move the packages upward and outward, away from the transfer station 22.

A pair of telescoping tubes 103A and 103B form the support for boom 24, the upper tube 103A having a pivot connection 100 to the trusses 98 of boom 24. Roller bearing 104 in mounting plate 105 provides rotational support for the vertical tubes along with a lower thrust bearing 106 at the bottom of tube 103B. A large driven spur gear 108 is attached to tube 103B and is driven by a smaller gear 109 on hydraulic motor 28. Hydraulic cylinder 110, internal of tubes 103A, 103B controls their telescopic action and thus regulates the height of the pivot 100 above the bed floor.

A further hydraulic control cylinder 112 is connected between cylinder 103A and the side trusses 98 to control the azimuth of discharge conveyor 18.

Control Circuit

Figure 12:
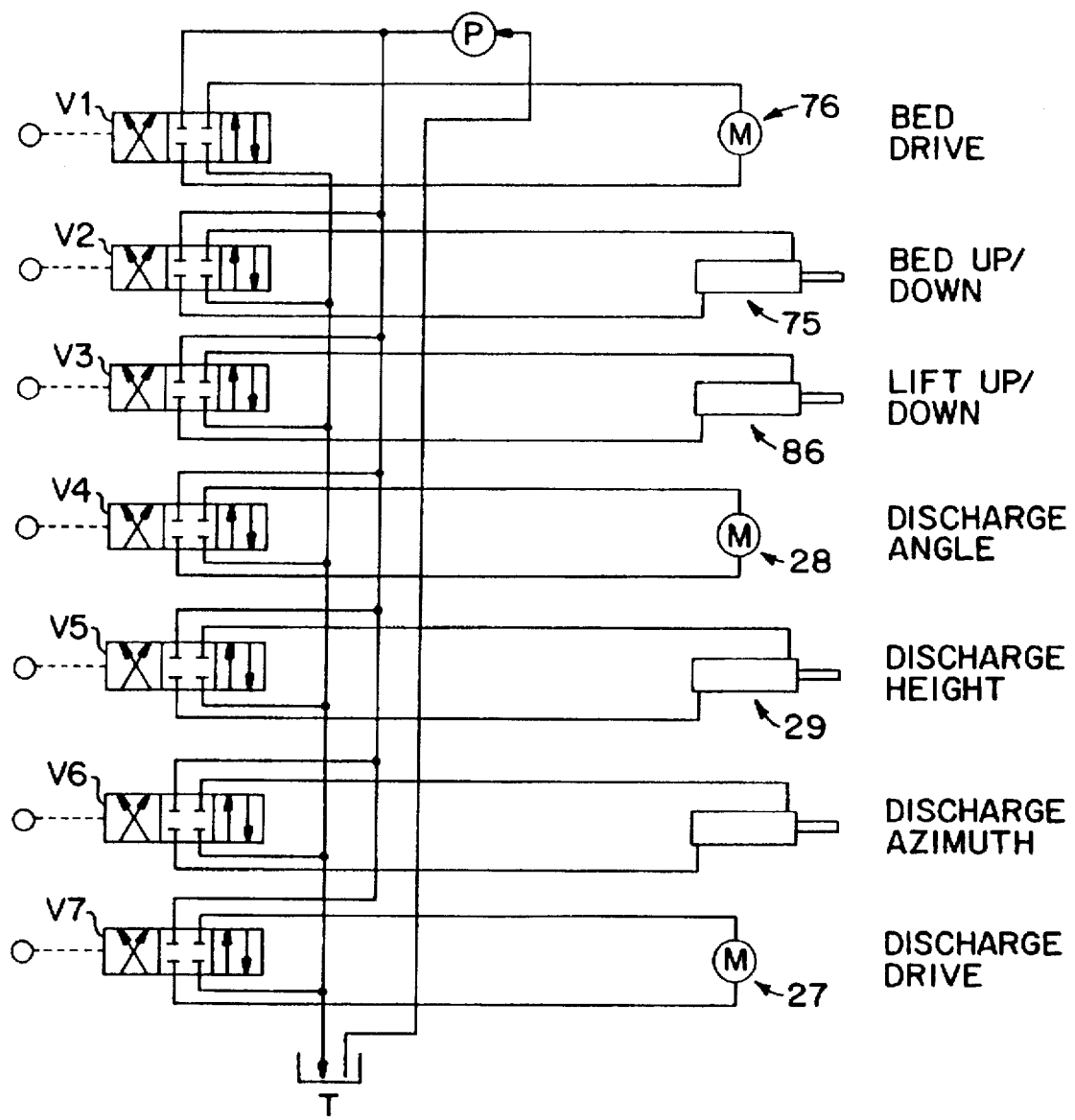
FIG. 12 is a hydraulic control diagram.

FIG. 12 shows the control circuit for the bed conveyor, the discharge conveyor, and the lift platform. The symbols represent the pump P, which may be driven by a power take-off from the vehicle motor, drawing fluid from a tank T and supplying fluid under pressure to a set of control valves V1–V6 which are mounted at the transfer station for convenient use by the operator. Valve V1 controls the direction and supply/return of hydraulic fluid to bed conveyor drive motor 86. Valve V2 controls the fluid supply/return to the bed conveyor lift cylinders 85. Valve V3 controls the supply/ return of fluid to the lift platform cylinder 86. Valve V4 controls the supply/return of fluid to the turret rotating motor 28 and valve V5 controls the supply/return of fluid to the azimuth control cylinder 29, and valve V6 controls the supply/return of fluid to the cylinder 110 which lifts and lowers the discharge conveyor mounting, while valve V7 controls the discharge conveyor drive motor 27.

The operator thus has control of the entire system available at the transfer station 22 to pace the operations of the conveyors and lift platform to the work of moving packages off the platform 40 and onto conveyor 18.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. In a truck for transporting palletized loads of stacked packages and delivering the packages in serial fashion to a chosen station remote from the truck, said truck having a bed and a generally rectangular bed floor thereon including a load bearing surface onto which loads of packages can be placed in one or more rows along said bed floor, said bed floor having one end providing a transfer station at which the packages may be removed from the loads and placed on a delivery device;

the improvement comprising an unloading and delivery apparatus including a delivery conveyor supported at said one end of said bed platform and arranged to extend outward of said bed platform over a range of elevations and directions with respect to said transfer station, said delivery conveyor having a receiving end adjacent said transfer station and a delivery end, means for driving said delivery conveyor to receive the packages in serial fashion at said transfer station and to move the packages to said delivery end, a lift located on said bed floor at said transfer station, said lift including a lift platform movable from a lower position generally coplanar with said bed floor to raised positions above said bed floor, lift mechanism on said bed supporting said lift platform for movement between its lower and raised positions, a bed conveyor supported in said bed floor and extending lengthwise thereof to said lift platform, and drive mechanism for said bed conveyor to carry the palletized loads along said bed platform and onto said lift platform.

2. The improvement in a delivery truck as defined in claim 1, wherein said bed conveyor comprises a plurality of endless conveyor chains having upper and lower flights, said upper flights extending along the surface of said bed floor and normally recessed therein, means for raising said upper flights above said bed floor to lift the loads slightly above said bed floor surface, and means for driving said bed conveyor chains in unison so as to move said loads of packages toward said lift platform.

3. The improvement in a delivery truck as defined in claim 2, wherein the loads are placed in multiple rows lengthwise of said bed floor, and said bed conveyor includes multiples of said conveyor chains extending along said bed platform in spaced apart parallel replation to provide for lifting and moving all of the loads of packages over said bed floor toward said transfer station.

4. The improvement in a delivery truck as defined in claim 2, wherein said means for raising said upper chain flights includes rails extending along said bed platform and pivotal links connecting and supporting said rails in said bed floor, and means for swinging said links in unison to raise and lower said rails with respect to said bed floor.

5. The improvement in a delivery truck as defined in claim 1, wherein said lift mechanism includes lifting links connecting and supporting said lift platform on said bed, and means for raising and lowering said lift platform to elevate loads as packages are removed from the top thereof and placed on said delivery conveyor.

6. The improvement in a delivery truck as defined in claim 5, wherein said means for raising and lowering said lift platform includes a control for positioning said lift platform at selected different elevations with respect to said bed whereby the uppermost packages on a load borne by said lift platform can be adjusted to correspond generally in elevation to the position of said receiving end of said delivery conveyor.

7. The improvement as defined in claim 5, including a turret support at said transfer station connected to said receiving end of said delivery conveyor, said turret support providing for rotation movement of said delivery conveyor around said transfer station, said turret support also including an azimuth control cylinder attached to said delivery conveyor and operable to adjust the vertical angle of said delivery conveyor with respect to said transfer station.

8. The improvement in a delivery truck as defined in claim 4, further including said bed floor having elongated slots therein providing for passage of said chains, central rails extending beneath said bed platform and aligned beneath said slots, said links being supported on said central rails whereby said support rails are movable between a lowered position resting on said central rails and a raised position above said central rails and aligned with said slots, said lower flights of said chains extending along said central rails and said upper flights of said chains extending along and supported by said support rails.

9. A method of off loading individual packages from palletized loads of the packages on a bed platform of a vehicle, comprising stacking the plurality of loads in at least one row extending lengthwise of the bed platform, conveying the loads along the bed platform to a lift platform located at a package transfer station adjacent one end of the platform bed, transferring the individual packages in serial fashion from the loads on the lift platform onto an off loading conveyor extending from the transfer station to a chosen site remote from the platform bed, and raising the lift platform as the packages are off loaded to maintain the top packages on a partially depleted load at approximately the same elevation as the loading end of the off loading conveyor.

* * * * *